US007594396B2

(12) United States Patent
Toji

(10) Patent No.: US 7,594,396 B2
(45) Date of Patent: Sep. 29, 2009

(54) HYDRAULIC CONTROLLER FOR WORKING MACHINE

(75) Inventor: Yutaka Toji, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 11/860,313

(22) Filed: Sep. 24, 2007

(65) Prior Publication Data

US 2008/0016861 A1 Jan. 24, 2008

Related U.S. Application Data

(62) Division of application No. 11/613,697, filed on Dec. 20, 2006, now abandoned, which is a division of application No. 10/842,460, filed on May 11, 2004, now Pat. No. 7,155,909.

(30) Foreign Application Priority Data

May 15, 2003 (JP) ............................ 2003-137446

(51) Int. Cl.
*F16D 31/02* (2006.01)

(52) U.S. Cl. ........................................................ 60/468

(58) Field of Classification Search .................... 60/468
See application file for complete search history.

(56) References Cited

U.S. PATENT DOCUMENTS 5,159,813 A 11/1992 Yoshimatsu et al.
5,394,697 A 3/1995 Hirata
5,873,245 A * 2/1999 Kato et al. .................... 60/445
7,155,909 B2 1/2007 Toji
2002/0112475 A1 8/2002 Cannestra
2005/0204736 A1 9/2005 Toji et al.

FOREIGN PATENT DOCUMENTS

| | | |
|---|---|---|
| EP | 0 582 859 | 2/1994 |
| EP | 0 597 109 | 5/1994 |
| JP | H02-088005 | 7/1990 |
| JP | A-H10-073101 | 3/1996 |
| JP | 11-303809 | 11/1999 |
| JP | A-2000-046015 | 2/2000 |

* cited by examiner

*Primary Examiner*—F. Daniel Lopez
(74) *Attorney, Agent, or Firm*—Oblon, Spivak, McClelland, Maier & Neustadt, L.L.P.

(57) ABSTRACT

A hydraulic controller for working machine according to the present invention, which presupposes an electronic control system where an integrated bleed-off valve common to hydraulic actuators is used for bleed-off control and the bleed-off valve is controlled by the secondary pressure of a proportional solenoid valve controlled by a controller, is constituted to compensate supply of a pressure oil for the hydraulic actuators even if the secondary pressure of the proportional solenoid valve is stopped, by providing, at the bleed-off valve, a fail-safe position with a fail-safe path which opens with an opening having smaller area than an unload opening.

1 Claim, 8 Drawing Sheets

HYDRAULIC CONTROLLER FOR WORKING MACHINE

CROSS REFERENCE TO RELATED APPLICATIONS

The present application is a Divisional Application of U.S. Ser. No. 11/613,697, filed Dec. 20, 2006, which is a divisional of U.S. Ser. No. 10/842,460 filed May 11, 2004, and is based on Japanese patent application No. 2003-137446, filed May 15, 2003, which is hereby incorporated herein by reference in its entirety.

BACKGROUND OF THE INVENTION

1. Field of the Invention

The present invention relates to a hydraulic controller for working machine.

2. Description of the Related Art

In hydraulic excavator, bleed-off control is used in order to put a part (surplus part) of the pressure oil discharged from a pump back to a tank.

A general bleed-off control provides a bleed-off path in the control valve provided for each of a plurality of actuators, and to change the opening area of the path according to operation amount of an operating means, which requires the control valve to be longer in a direction of a spool axis of the valve.

To overcome the foregoing deficiency, there is proposed a technique of arranging a common bleed-off valve for a plurality of control valves. One known electronic control system is to use a hydraulic pilot valve for the bleed-off valve, and to control the bleed-off valve using the secondary pressure of a proportional solenoid valve controlled by a controller (refer to Japanese Patent Laid-Open Publication No. 11-303809 for example).

In accordance with the system above, however, in the case of a failure of the proportional solenoid valve itself or an abnormality of the control system such as a disconnection of the signal system for transmitting control signal from the controller to the proportional solenoid valve, the bleed-off valve is turned to an unload position (maximum opening position) thereof to unload a total amount of oil discharged from the pump, which results in a complete halting of the machine.

Consequently, the foregoing system suffers from a problem in that the working machine could be brought to a standstill on work site.

SUMMARY OF THE INVENTION

Accordingly, an object of the present invention is to provide a hydraulic controller for working machine which enables continuing operations even in a failure of the control system with an electronic control system using an integrated bleed-off valve.

The hydraulic controller for working machine of the present invention has the following basic constitution.

That is, the hydraulic controller for working machine of the present invention comprises hydraulic actuators, a hydraulic pump as a hydraulic pressure source for the hydraulic actuators, control valves for controlling the motion of each of the hydraulic actuators based on operation of an operating means, a bleed-off valve for putting a surplus part of the pressure oil discharged from the hydraulic pump back to a tank, a control means for controlling the bleed-off valve, and further a compensating means for compensating supply of the pressure oil from the hydraulic pump to each of the hydraulic actuators in a condition that the control means can not control the bleed-off valve.

In accordance with the present invention, supply of the pressure oil from the hydraulic pump to each hydraulic actuator is ensured by the compensating means in the case the control of the bleed-off valve by the control means is disabled.

Accordingly, the motion of the hydraulic actuator is also ensured even in a failure of the system such as a disconnection of the signal line for connecting the control means and the bleed-off valve, whereby this invention can prevent the machine from being halted completely to be brought to a standstill. As a result, it enables continuing operations.

DESCRIPTION OF THE PREFERRED EMBODIMENTS

The hydraulic controller for working machine according to the present invention will be more fully understood from the following description based on FIGS. 1 to 6.

In the following embodiments, there is taken for example an arrangement to apply bleed-off control by a common bleed-off valve (integrated bleed-off valve) to three hydraulic actuators 1, 2, and 3.

For hydraulic excavator, boom cylinder, bucket cylinder and motor for right-hand side traveling are cited as an example, respectively, of the hydraulic actuators 1, 2, and 3.

Figure 1:
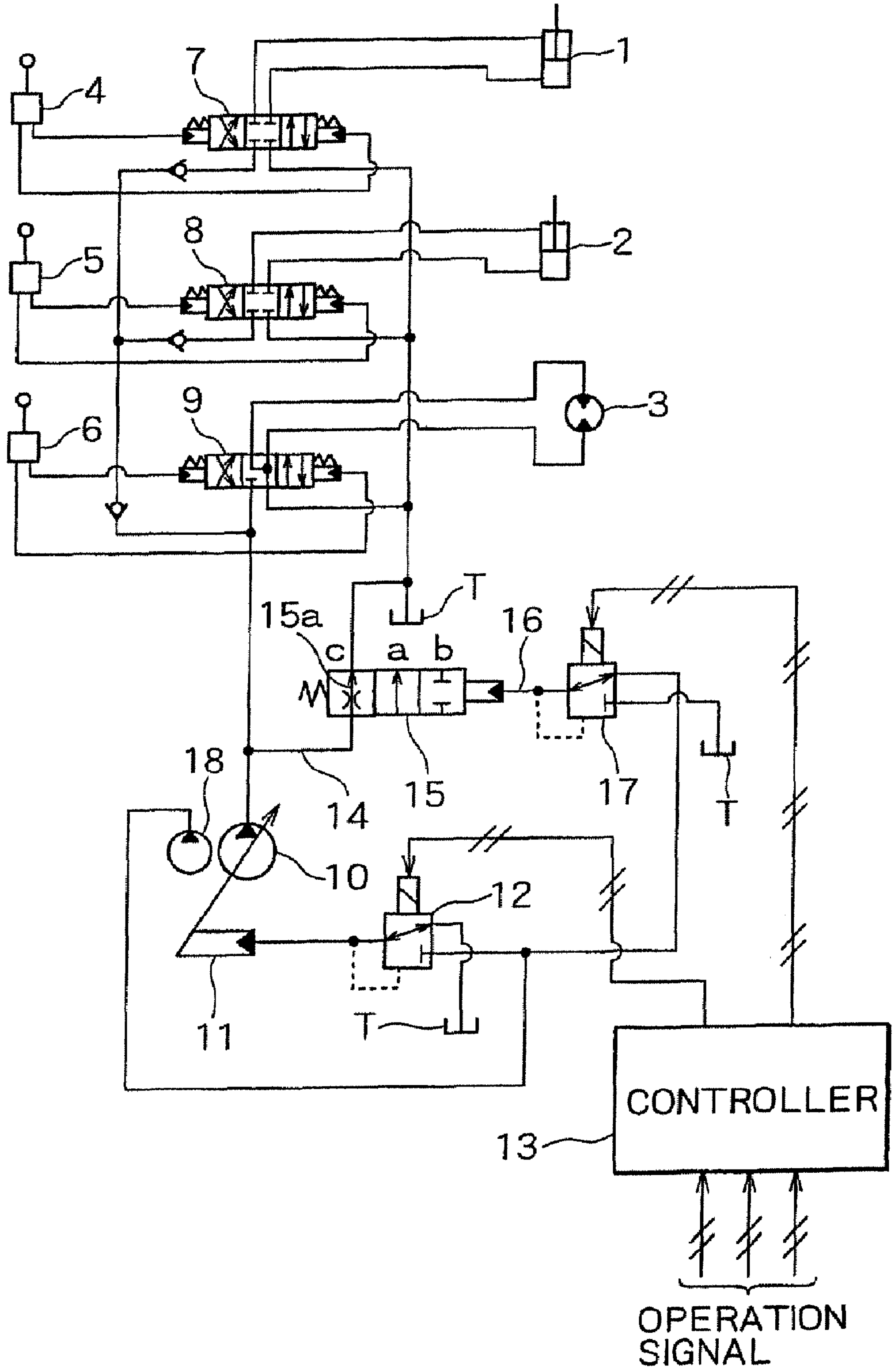
FIG. 1 is a circuit configuration diagram of a hydraulic controller according to the first embodiment of the present invention.
Figure 2:
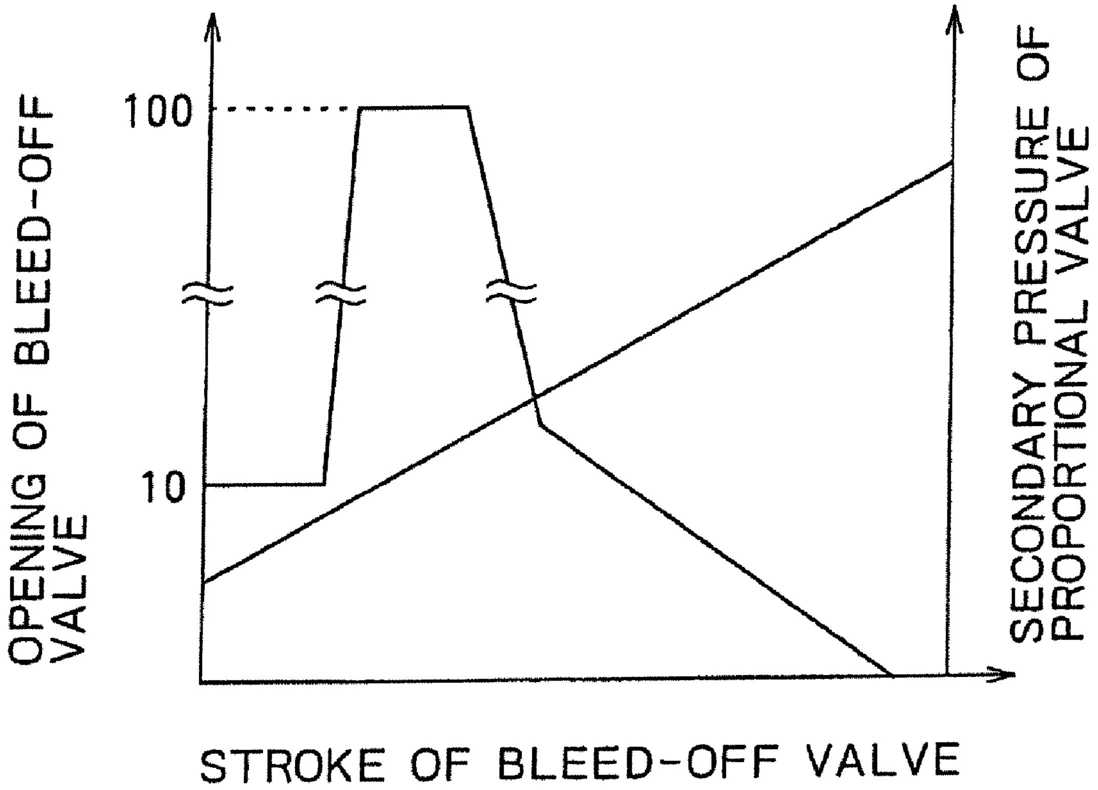
FIG. 2 is a graph showing the opening characteristics of the bleed-off valve in the first embodiment.

First Embodiment (Refer to FIGS. 1 and 2)

Each of the hydraulic actuators 1, 2, and 3 is connected to a capacity variable hydraulic pump 10 through hydraulic pilot type control valves 7, 8, and 9 operated, respectively, by remote control valves 4, 5, and 6 as an operating means, the direction and speed of each motion of the actuators 1, 2, and 3 being controlled by the control valves 7 to 9.

A pump regulator 11 for controlling the discharge amount (tilting angle) from the hydraulic pump 10 is controlled by an electromagnetically proportional regulator controlling valve 12. The regulator controlling valve 12 is controlled by signals from a controller 13 based on an operation of the remote control valves 4 to 6.

That is, the hydraulic pump 10 is controlled by positive control method (hereinafter abbreviated to PC method), in which method the discharge amount from the pump is controlled according to the operation amount of the remote control valves 4 to 6. The PC method includes a method for controlling discharge amount from a pump in such a manner that the discharge amount increases as the operation amount of the remote control valves 4 to 6 as operating means increases.

In the case above, the pump may be controlled based on the operation signal from the remote control valve having maximum operation amount, or on the operation signal of a certain one out of remove control valves 4 to 6 in a multiple operation where two or more valves among the remote control valves 4 to 6 are operated simultaneously.

A bleed-off pipeline 14 is provided between a pipeline on the discharge side of the hydraulic pump 10 and a tank T. In the bleed-off pipeline 14 is provided a hydraulic pilot integrated bleed-off valve (hereinafter referred to simply as bleed-of valve) 15 for applying bleed-off control to each of the actuators 1 to 3 in a lump.

The bleed-off valve 15 operates at both positions consisting of an unload position "a" (maximum opening position) for maximum opening area, and a block position "b" for zero opening area. Bleed-off controls are made between the positions "a" and "b".

In addition, the bleed-off valve 15 has a fail-safe position "c" as an inoperative (neutral) position. In the fail-safe position c, a fail-safe path 15*a* (compensating means) is constituted to open with an opening having smaller area than the unload opening (opening in the unload position).

FIG. 2 shows the opening characteristics of the bleed-off valve 15. In the fail-safe position c, the opening area is about one-tenths (10 $cm^2$) for example of maximum opening area, while varying between the maximum (100 $cm^2$) and minimum value (0 $cm^2$) according to the stroke between the unload position a and the block position b.

Accordingly, the bleed-off flow rate in the fail-safe position c shows about 10% of the maximum bleed-off flow rate, and therefore, the other 90% of the flow rate may be supplied to the actuators 1 to 3.

In a pilot line 16 of the bleed-off valve 15 is provided a proportional solenoid valve 17 controlled by the controller 13. The secondary pressure of the proportional solenoid valve 17 (shown in FIG. 2) is supplied to a pilot port of the bleed-off valve 15 as a pilot pressure.

That is, the controller 13 and the proportional solenoid valve 17 constitute a control means, the control means controlling the opening area (aperture or opening ratio) of the bleed-off valve 15.

The numerical 18 indicates a pilot pump where a discharge side of the pilot pump is connected to a primary side of each of the regulator controlling valve 12 and the proportional solenoid valve 17. Namely, the pilot pump 18 operates as a hydraulic pressure source common to both the pump regulator 11 and the proportional solenoid valve 17.

In the foregoing configuration, if the remote control valves 4 to 6 are operated in a normal condition, signals based on the operation signal are output from the controller 13 to the regulator controlling valve 12 and the proportional solenoid valve 17. The discharge amount from the pump then varies according to the operation amount, while the bleed-off valve 15 operates between the unload position a and the block position b to vary the bleed-off flow rate by PC method.

Meantime, in the case, for example, the control of the proportional solenoid valve 17 is disabled, namely, the value 17 is out of control due to an abnormality or disorder including a failure such as a disconnection of the control system for connecting the controller 13 and the proportional solenoid valve 17, the bleed-off valve 15 is stopped at the unload position a to put almost all discharge amount from the pump back to the tank T in a conventional system, while at the fail-safe position c in the present system.

In this case, about 10% of the maximum bleed-off flow rate is put back to the tank T, and therefore, the rest may be supplied to the actuator circuit as described above. Therefore, in a failure condition, the motion of the actuator ensured to be approximate to that in a normal condition. This enables the machine to avoid any complete halting, and sufficiently to continue operations without any problem, though the performance may be reduced slightly.

Operating of the remote control valves 4 to 6 as an operating means to compensate for the actuator flow rate by the fail-safe path 15*a* causes an increase of the discharge amount from the pump in accordance with the operation amount thereof, which results in an increase of the system pressure. Therefore, the actuator performance may be ensured to be equal or approximate to that in a normal condition.

Additionally, it is only required to add fail-safe position c (fail-safe path 15a) to the bleed-off valve 15 in the present embodiment, which enables a simply constituted and low cost system.

From the foregoing description, in the present embodiment, the fail-safe path 15*a* of the bleed-off valve 15 functions as a compensating means in a condition that the control of the bleed-off valve 15 by the control means is disabled, whereby supply of the pressure oil from the hydraulic pump 10 to each of the hydraulic actuators 1 to 3 may be compensated.

The constitution of the present embodiment, which generally presupposes PC method as described above, may be applied to cases without PC method (a case of a control system where the discharge amount of the pump is in its maximum value at any time, for example).

Figure 3:
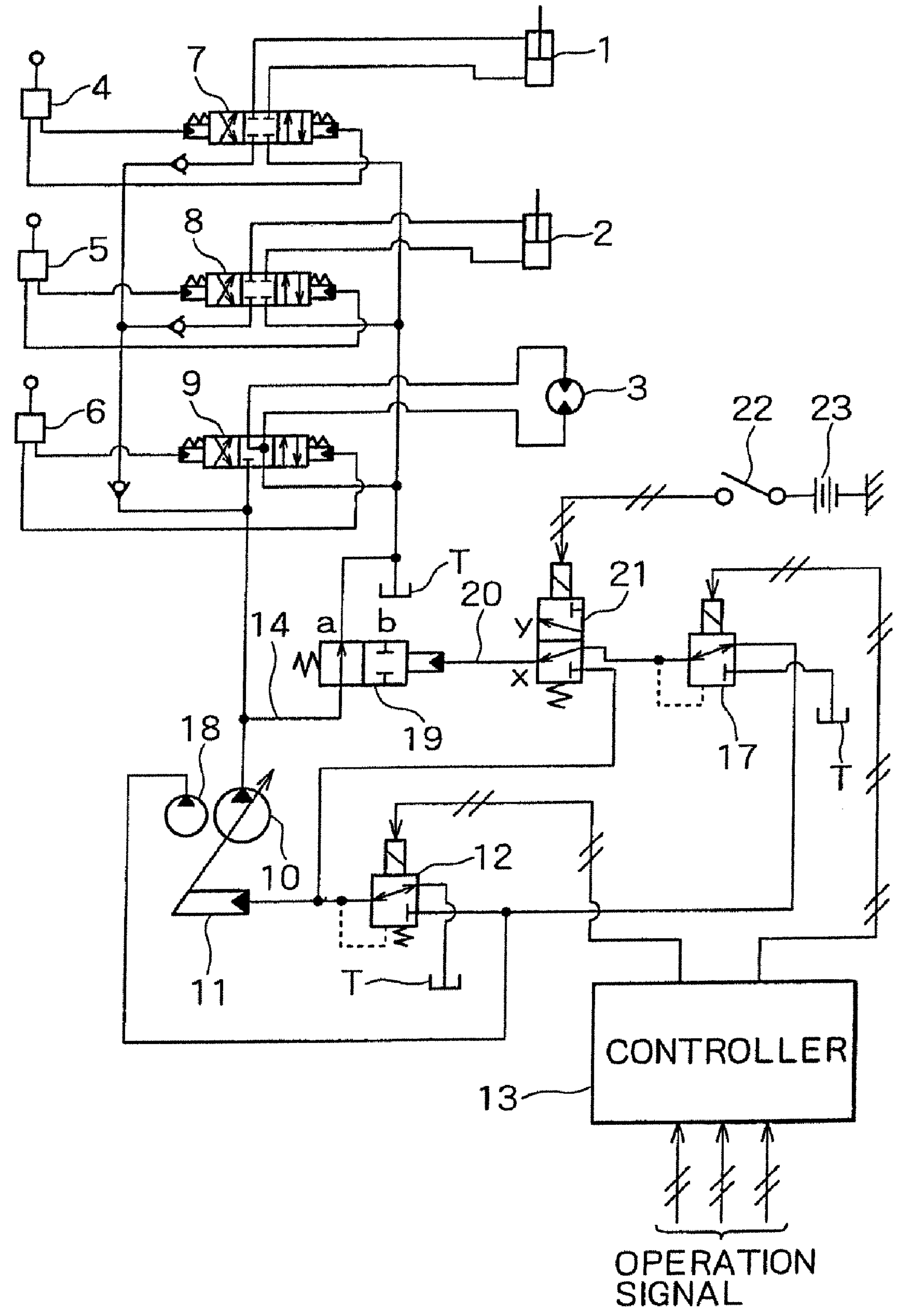
FIG. 3 is a circuit configuration diagram showing the second embodiment of the present invention.
Figure 4:
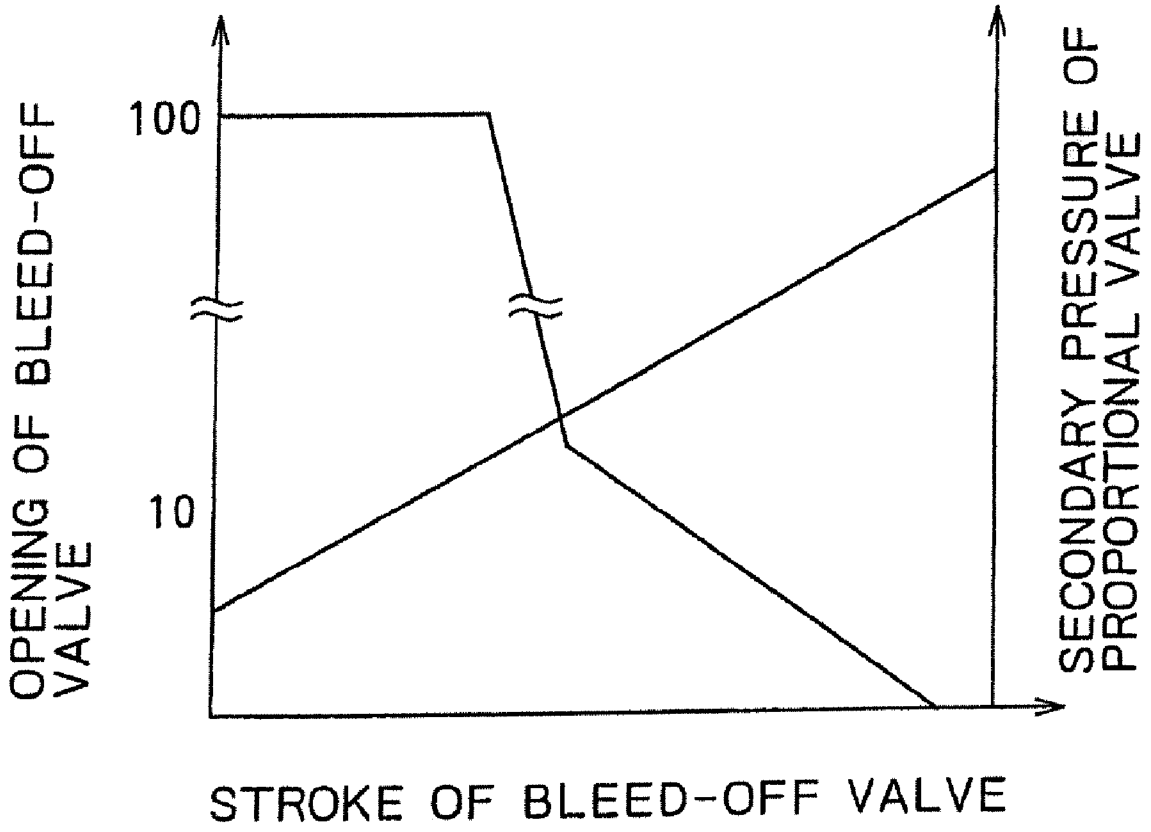
FIG. 4 is a graph showing the opening characteristics of the bleed-off valve in the second embodiment.

Second Embodiment (Refer to FIGS. 3 and 4)

In the following embodiment, only differences from the first embodiment will be described.

In the first embodiment, the bleed-off valve 15 with the fail-safe position c is provided in the bleed-off pipeline 14. On the contrary, in the second embodiment is provided a hydraulic pilot bleed-off valve 19 operating only between the unload position "a" and the block position "b". In a pilot line 20 for connecting a pilot port of the bleed-off valve 19 and the proportional solenoid valve 17 is provided a pilot pressure switching valve 21 (an electromagnetic switching valve) as compensating means.

The pilot pressure switching valve 21 has a normal position x, the lower one in the drawing, where the secondary pressure of the proportional solenoid valve 17 is supplied to the bleed-off valve 19 as pilot pressure, and a fail-safe position y, the upper one in the drawing, where the pump controlling pressure supplied to the pump regulator 11 is supplied to the bleed-off valve 19 as pilot pressure. In this case, the pilot pressure switching valve 21 is switched from the normal position x to the fail-safe position y when a switch 22 as a switching means is operated to turn on. The numerical 23 indicates a power supply.

In the foregoing configuration, the bleed-off valve 19 strokes between the maximum opening (100 $cm^2$) and the minimum opening (0 $cm^2$) as shown in FIG. 4 by the secondary pressure of the proportional solenoid valve 17 based on an operation of the remote control valve 4 to 6 in a normal condition.

Meantime, in the case of a failure such as a disconnection, the pilot pressure switching valve 21 switches to the fail-safe position y, whereby the bleed-off valve 19 becomes controlled by the pump controlling pressure instead of the previous secondary pressure of the proportional solenoid valve 17.

This pump controlling pressure, which varies according to the operation amount of the remote control valves 4 to 6 as is the case with the secondary pressure of the proportional solenoid valve 17, is controlled in the same way as in a normal condition even if the bleed-off valve 19 is in failure, whereby the motion of the actuator may be ensured to be the same as that in a normal condition.

In the present embodiment, the pilot pressure switching valve 21, which is provided between the proportional solenoid valve 17 and the bleed-off valve 19 constituting a control means, functions as a compensating means in a condition that the control of the bleed-off valve 19 by the control means is disabled, whereby supply of the pressure oil from the hydraulic pump 10 to each of the hydraulic actuators 1 to 3 may be compensated.

Figure 5:
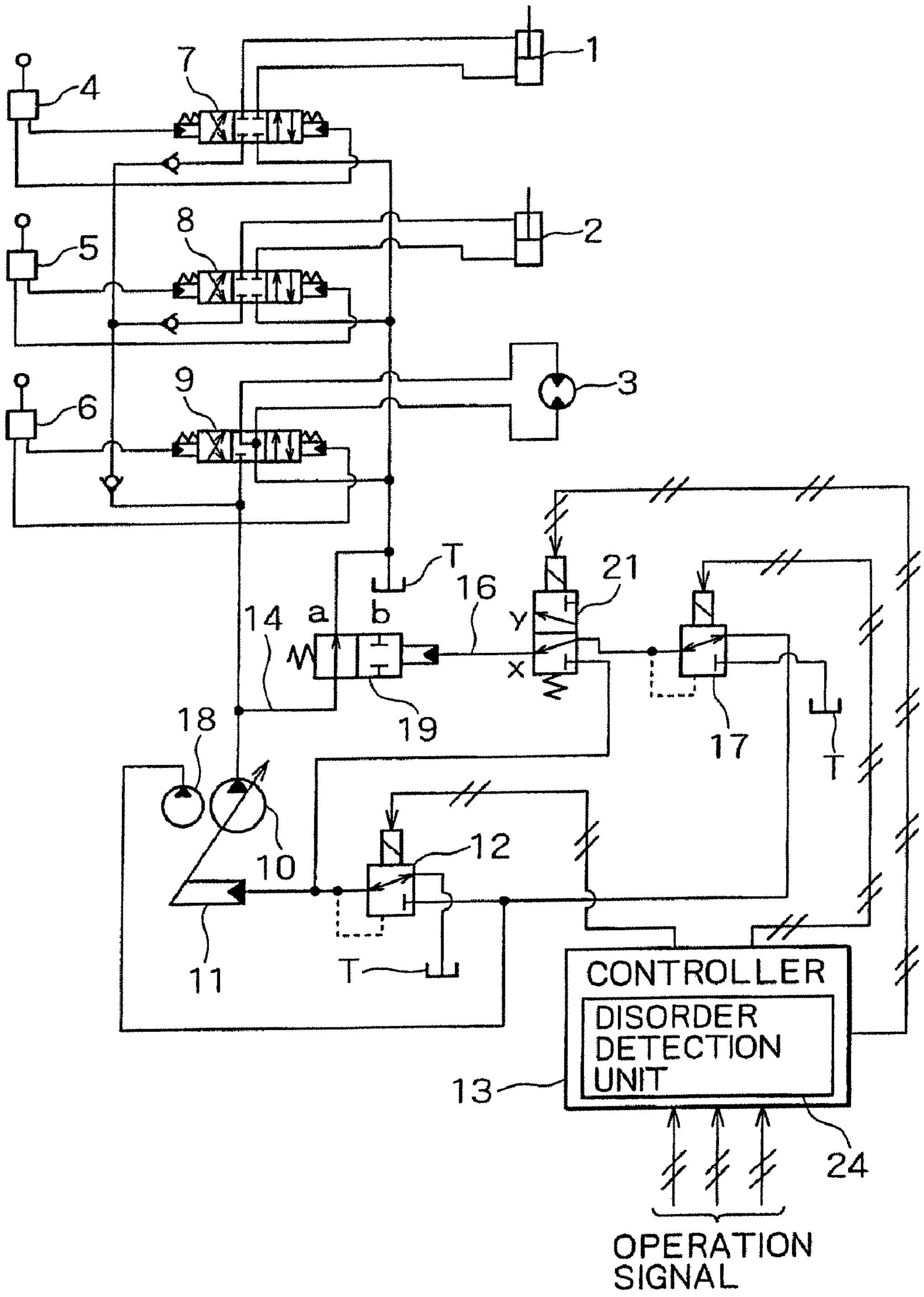
FIG. 5 is a circuit configuration diagram showing the third embodiment of the present invention.
Figure 6:
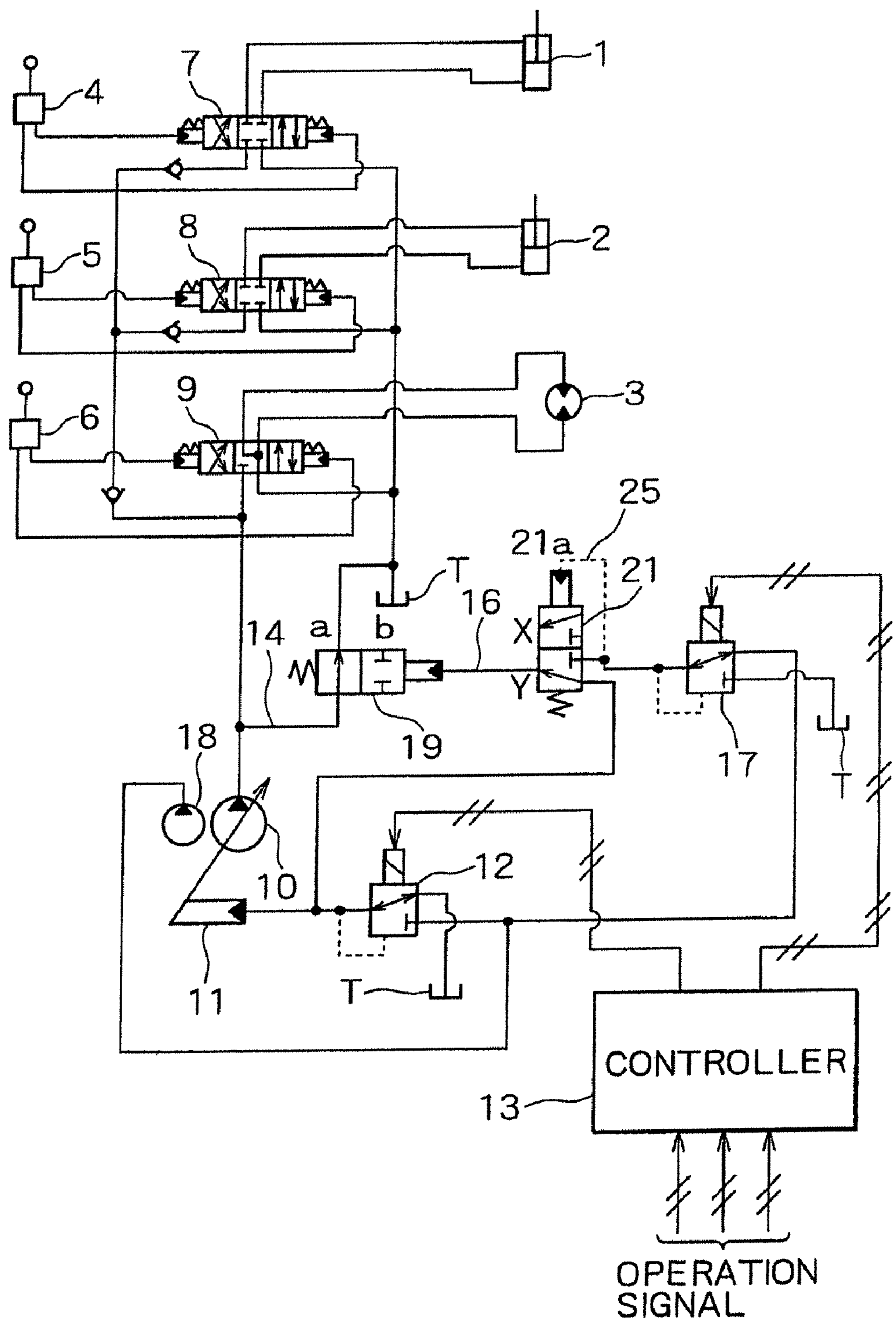
FIG. 6 is a circuit configuration diagram showing the fourth embodiment of the present invention.

Third and Fourth Embodiment (Refer to FIGS. 5 and 6)

In the third and fourth embodiments, it is presupposed, as is the case with the second embodiment, that the pilot pressure switching valve 21 switches the pilot pressure of the bleed-off valve 19 between the secondary pressure of the proportional solenoid valve 17 and the pump controlling pressure.

In the third embodiment shown in FIG. 5, a disorder detection unit 24 is provided in the controller 13. The disorder detection unit 24 detects abnormality or disorder such as a disconnection of an output signal for the proportional solenoid valve 17. A switching signal indicating a switch to the fail-safe position y is output from the controller 13 to the pilot pressure switching valve 21 when the disorder detection unit 24 detects an abnormality or disorder.

Namely, the controller 13 also operates as switching means which switches between the positions including the fail-safe position y of the pilot pressure switching valve 21.

Meantime, in the fourth embodiment shown in FIG. 6, a hydraulic pilot switching valve is used for the pilot pressure switching valve 21 instead of the electromagnetic switching valve in both the second and third embodiments.

A pilot line 25 is also provided with this hydraulic circuit as switching means for supplying a pilot port 21*a* of the pilot pressure switching valve 21 with the secondary pressure of the proportional solenoid valve 17 as pilot pressure. The secondary pressure is a hydraulic pressure source of the pilot pressure switching valve 21.

In this case, the pilot pressure switching valve 21 is set to the normal position x, the upper one in the drawing, in a normal condition with the secondary pressure of the proportional solenoid valve being supplied as a pilot pressure, while is switched to the fail-safe position y, the lower one in the drawing, in a failure condition with no secondary pressure of the proportional solenoid valve (pilot pressure) being supplied.

FIG. 6 shows a state with being switched to the fail-safe position y in a failure condition.

Accordingly, the bleed-off valve 19 is controlled, as is the case with the third embodiment, by the secondary pressure of the proportional solenoid valve and the pump controlling pressure, respectively, in a normal and a failure condition.

In accordance with both the third and fourth embodiments, the motion of the actuator even in a failure condition may be ensured not to be different from that in a normal condition, as is the case with the second embodiment, which enables continuing operations.

Additionally in accordance with the fourth embodiment, wherein the pilot pressure switching valve 21 is switched by hydraulic pressure, there is an advantage that the switching operation thereof may be ensured even in a power supply failure with electrical signals being disrupted completely, compared with both the second and third embodiments, wherein the pilot pressure switching valve 21 is switched by electrical signal.

From the foregoing description about the constitution of the second to fourth embodiments, the pump controlling pressure in PC method is send to the bleed-off valve 19 through the pilot pressure switching valve 21 as a pilot pressure in a failure condition, whereby the bleed-off valve 19 may be ensured to operate. That is, the motion of the actuator may be ensured to be the same as that in a normal condition without being affected by the failure.

In addition, bleed-off control according to the operation amount of the operating means enables to ensure the same operationality as in a normal condition without unreasonability in operation.

In the case above, the pilot pressure switching valve 21 is switched to the fail-safe position y by an operation of the switch 22, a switching signal from the controller 13 and a stopping of pilot pressure supply from the proportional solenoid valve 17, respectively, in the second, third and fourth embodiments.

Among the foregoing embodiments, in accordance with the constitution of the fourth embodiment, wherein the pilot pressure switching valve 21 is switched by hydraulic pressure, there is an advantage that the switching operation thereof may be ensured even in a power supply failure with electrical signals being disrupted completely.

Figure 7:
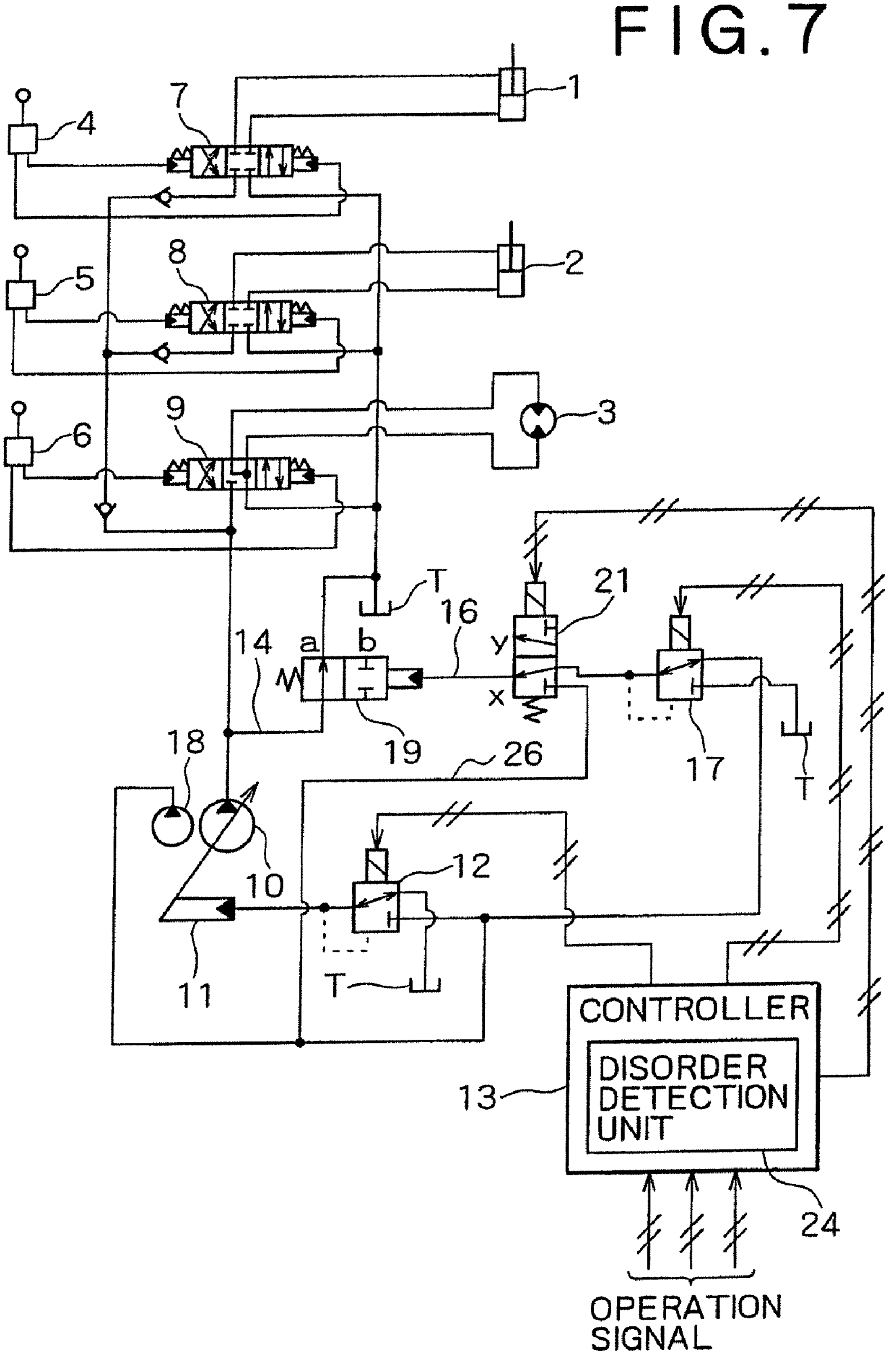
FIG. 7 is a circuit configuration diagram showing the fifth embodiment of the present invention.

Fifth Embodiment (Refer to FIG. 7)

In the second, third and fourth embodiments where the PC method is the method for controlling pump discharge amount according to the operation amount of the remote control valves, the pilot bleed-off valve 19 is operated between the unload position a and the block position b according to the operation amount of the remote control valves since, in a failure condition, the pump controlling pressure is provided to the pilot bleed-off valve 19.

Meanwhile, in the fifth embodiment, as pilot pressure, the discharge pressure of the pilot pump 18 as the primary pressure of the proportional solenoid valve 17 is supplied to the pilot bleed-off valve 19 in a failure condition.

Namely, one of inlet ports of the pilot pressure switching valve 21 is connected to the secondary side of the proportional solenoid valve 17, and the other of them is connected to the pilot pump 18 through a pilot pump pressure line 26.

In this case, when, in a failure condition, the pilot pressure switching valve 21 is switched to the fail-safe position x, under this condition, a discharge pressure (the primary pressure to the proportional solenoid valve 17) from the pilot pump 18 which is higher than the secondary pressure of the pilot pressure switching valve 21 under a condition prior to the failure condition is supplied directly to the pilot bleed-off valve 19 as pilot pressure. Accordingly, the pilot bleed-off valve 19 is secured to the block position "b" for closing the bleed-off pipeline 14.

As a result, the entire discharge amount of the pump 10 is provided with actuator circuit including the hydraulic actuators. This results in securing of sufficient flow rate even on work with heavy load and then there is no fear of stopping of the actuators due to shortage of the flow rate.

Figure 8:
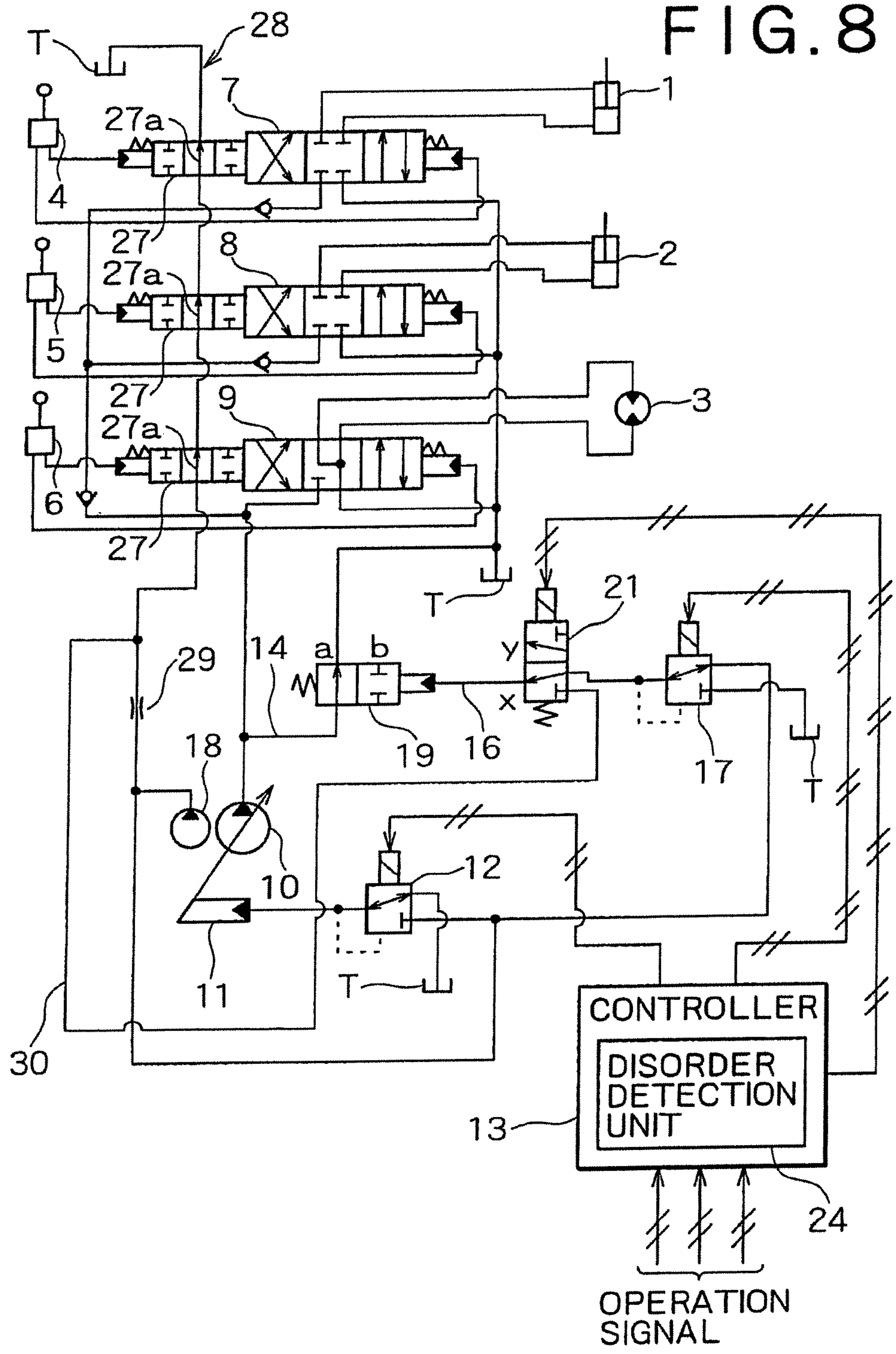
FIG. 8 is a circuit configuration diagram showing the sixth embodiment of the present invention.

Sixth Embodiment (refer to FIG. 8)

As a control valve for controlling the actuators, there is a switching valve having a main spool and a side spool which operates to stroke with the main spool and provided at one side of the main spool.

In this sixth embodiment, a switching valve with a side spool 27 of this kind is provided with each of the control valves 7, 8, and 9, respectively.

Side by-path passage 27*a* is provided with each of the side spools 27. The side by-path passage 27*a* opens at a neutral position of the remote control valves 4-6 and closes at a time of operation. Each side by-path passage 27*a* is connected in tandem, respectively, by side by-path line 28 and further is connected to the pilot pump 18 and the tank T.

Throttle valve 29 is provided with a discharge side of the pilot pump 18 in the side by-path line 28. The throttle valve 29 is for producing a pump pressure. Pilot pressure supply line 30 which is connected to exit-side of the throttle valve 29 is connected to one of the inlet port of the pilot pressure switching valve 21.

In a case of no operation of all the control valves 7-9, the side by-path passage 27*a* of the side spool 27 opens so as to connect the side by-path line 28 and the tank T. Accordingly, no pressure arises at the exit-side of the throttle valve 29. Meanwhile, in a case of operation of at least one of the control valves 7-9, the side by-path line 28 closes so as to produce pressure at the exit-side of the throttle valve 29.

Accordingly, when, in a failure condition, the control valves are operated under the condition that the pilot pressure switching valve 21 is switched from a normal position x to the fail-safe position y, the pressure at the exit-side of the throttle valve 29 is supplied to the pilot bleed-off valve 19 through the pilot pressure switching valve 21.

Namely, the bleed-off valve 19 is switched to the block position b only during operation so as to assure operation of the actuators.

The fifth and sixth embodiments are based upon the circuit constitution of the third embodiment that the disorder detection unit 24 of the controller 13 detects a failure and then switch the pilot pressure switching valve 21 to the fail-safe position x of FIGS. 5 and 6. On the contrary, the circuit constitution of the afore-mentioned embodiments is also applied to the second embodiment for using the switch 22 as switching means and to the third one using pilot switching valve for the pilot pressure switching valve 21.

The circuit constitution of the fifth and sixth embodiments is applied not only to the PC system but also to negative control system for controlling pump discharge amount according to negative control pressure and to load sensing system for controlling pump in such a manner that the difference between pump pressure and load pressure comes to be constant.

Although the invention has been described with reference to the preferred embodiments in the attached figures, it is noted that equivalents may be employed and substitutions made herein without departing from the scope of the invention as recited in the claims.

I claim:

1. A hydraulic controller for working machine comprising:

hydraulic actuators;

a hydraulic pump as a hydraulic pressure source for said hydraulic actuators;

control valves for controlling motion of each of said hydraulic actuators based on operation of an operating means;

a bleed-off valve for putting a surplus of pressure oil discharged from said hydraulic pump back to a tank;

a control means for controlling said bleed-off valve; and means for preventing the bleed-off valve from putting a surplus of pressure oil discharged from said hydraulic pump back to the tank when the control means cannot control the bleed-off valve and when at least one of said control valves is functioning to control motion of one of said hydraulic actuators based on operation of the operating means.

* * * * *